H. S. Berry,
Tuyere,
N° 22,012. Patented Nov. 9, 1858.
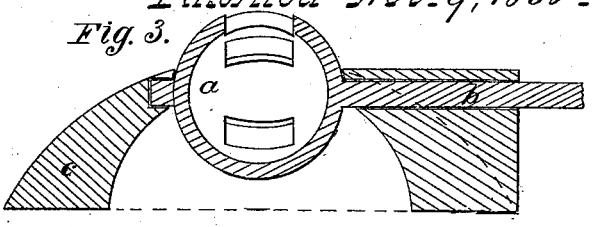
Fig. 3.
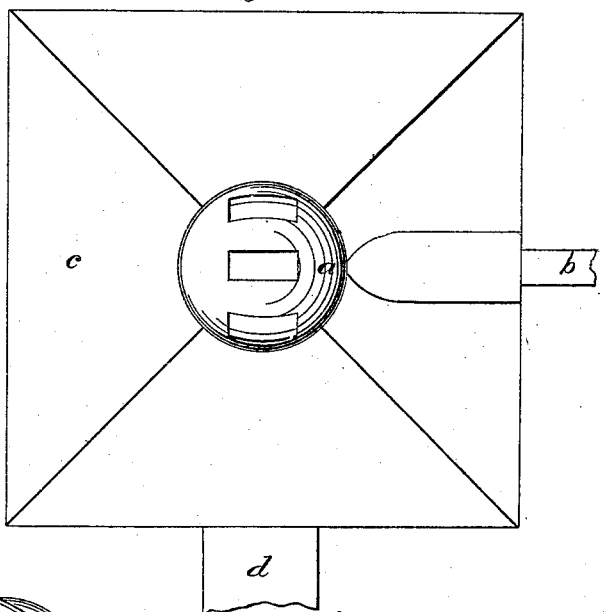
Fig. 2.
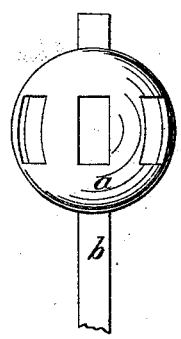
Fig. 5.
Fig. 4.
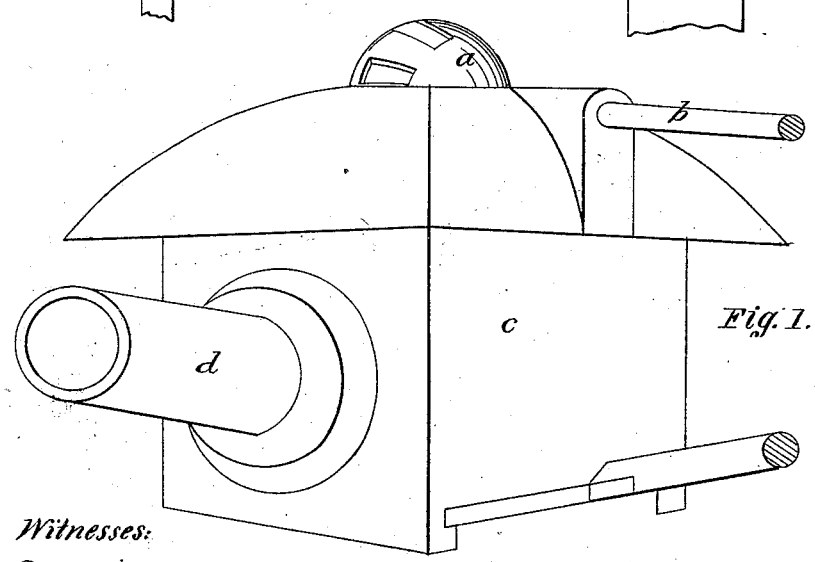
Fig. 1.
Witnesses:
Inventor
Harvey S. Berry

UNITED STATES PATENT OFFICE.

H. S. BERRY, OF RUTLAND, VERMONT.

BLACKSMITH'S TWYER.

Specification of Letters Patent No. 22,012, dated November 9, 1858.

*To all whom it may concern:*

Be it known that I, HARVEY S. BERRY, of Rutland, in the county of Rutland and State of Vermont, have invented a new and Improved Twyer for Blacksmiths' Fires and Forges; and I hereby declare that the following is a full and exact description of the same, reference being had to the accompanying drawings and the letters of reference marked thereon.

Figure 1, is a view of the wind box or chest with a portion of the twyer protruding from the top. Fig. 2, is a view of the same from above. Fig. 3, is a section of the dome of the wind box and of the twyer. Fig. 4, is a view of the twyer. Fig. 5 represents a section of the same.

Each letter of reference belongs to the same part of the machine in all the figures.

The twyer (*a*) is a hollow ball of cast iron or other suitable material, of three inches in diameter or thereabout, secured upon and turned by, an axis or handle (*b*). This axis should be so adjusted in the dome-shaped top of the wind box (*c*) that nearly half the ball may rise above it through an aperture beveled and fitted to the ball as closely as may be without impeding its motion. The blast is forced from the bellows into the wind-box by the pipe (*d*.) It reaches the fire, (which is made directly over the ball,) through five apertures in the ball, arranged in a circle perpendicular to the axis. Four of these apertures are at equal distances, from each other, (*i. e.* their centers a quarter of a circle apart,) and the fifth is between two of these four in the same line. Thus the ball may be so turned that either one, two or three of these apertures will be exposed above the box and furnish blast for the fire, while the remainder are within the box and receive the wind. The workman is enabled by this device to diminish and confine his fire to a limited space, or to spread and increase it at his pleasure.

The wind box is made with a sliding bottom so as to be cleaned readily from the cinders, ashes and other dirt which may collect in it.

What I claim as my invention, and desire to secure by Letters Patent is—

A twyer revolving in a wind box supplied with wind in any ordinary way, with apertures through it so arranged as to bring more or less of them at pleasure to bear upon the fire, and thereby diminish the fire and circumscribe the space affected by the blast, or enlarge the space and increase the fire.

HARVEY S. BERRY.

Witnesses:
J. H. HODGES,
JONAS WELLER.